(12) United States Patent
Baughman et al.

(10) Patent No.: US 11,954,209 B2
(45) Date of Patent: Apr. 9, 2024

(54) COGNITIVE MALWARE AWARENESS IMPROVEMENT WITH CYCLAMATES

(71) Applicant: INTERNATIONAL BUSINESS MACHINES CORPORATION, Armonk, NY (US)

(72) Inventors: Aaron K. Baughman, Cary, NC (US); Tiberiu Suto, Franklin, NY (US); Shikhar Kwatra, San Jose, CA (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 17/655,439

(22) Filed: Mar. 18, 2022

(65) Prior Publication Data

US 2023/0297686 A1 Sep. 21, 2023

(51) Int. Cl.
*G06F 21/57* (2013.01)
*G06Q 10/1053* (2023.01)

(52) U.S. Cl.
CPC ....... *G06F 21/577* (2013.01); *G06Q 10/1053* (2013.01); *G06F 2221/034* (2013.01)

(58) Field of Classification Search
CPC .. G06F 21/577; G06F 2221/034; G06F 40/30; G06Q 10/1053; H04L 63/1425
See application file for complete search history.

(56) References Cited

U.S. PATENT DOCUMENTS

| | | | |
|---|---|---|---|
| 9,208,328 B2* | 12/2015 | Russello | G06F 21/52 |
| 9,813,454 B2 | 11/2017 | Sadeh-Koniecpol | |
| 10,469,519 B2 | 11/2019 | Irimie | |
| 10,491,619 B2 | 11/2019 | Yampolskiy | |
| 10,546,135 B1 | 1/2020 | Kassoumeh | |
| 10,581,894 B2 | 3/2020 | Zaffarano | |
| 10,581,910 B2 | 3/2020 | Sites | |
| 10,979,448 B2 | 4/2021 | Kras | |
| 2018/0190141 A1* | 7/2018 | Basumotari | G09B 19/06 |
| 2019/0180395 A1* | 6/2019 | Moretti | G06N 20/00 |
| 2019/0357045 A1* | 11/2019 | Jo | H04W 12/06 |
| 2020/0213355 A1* | 7/2020 | Ogan | H04L 63/1466 |
| 2020/0233955 A1* | 7/2020 | Ramzan | G06F 21/554 |
| 2020/0244704 A1* | 7/2020 | Andrews | G06F 8/65 |
| 2021/0110014 A1* | 4/2021 | Turgeman | G06F 11/3419 |

(Continued)

OTHER PUBLICATIONS

Thakur et al., "Malicious User Detection using Honeywords," 2023 International Conference on Communication System, Computing and IT Applications (CSCITA) Year: 2023 | Conference Paper | Publisher: IEEE.*

(Continued)

*Primary Examiner* — Roderick Tolentino
(74) *Attorney, Agent, or Firm* — Robert R. Aragona

(57) ABSTRACT

The present invention includes an embodiment that may determine an access level within an organization. The embodiment may generate a simulated scenario based on the access level. The embodiment may identify responses of the user to the generated simulated scenario. The embodiment may capture one or more input frames. The embodiment may analyze the responses and the one or more input frames and generate education for the user based on the responses and the one or more input frames.

17 Claims, 5 Drawing Sheets

(56) References Cited

U.S. PATENT DOCUMENTS

2021/0390181 A1* 12/2021 McClay ............... G06N 20/00
2023/0281472 A1* 9/2023 Asghari ............... G06N 20/20
706/12

OTHER PUBLICATIONS

Dai, Jun, "Situation Awareness-Oriented Cybersecurity Education," 2018 IEEE Frontiers in Education Conference (FIE) Year: 2018 | Conference Paper | Publisher: IEEE.*

Alotaibi et al. "Design and Evaluation of Mobile Games for Enhancing Cyber Security Awareness." Journal of Internet Technology and Secured Transactions (JITST), vol. 6, Issue 2, Jun. 2018, pp. 569-578.

Ki-Aries et al., "Persona-centred information security awareness." Computers & Security 70 (2017), Elsevier, Available online: Aug. 9, 2017, pp. 663-674.

Lehotsky, Structuring and Enhancing IT Security in Core Mobile Phone Use Cases. Diss. May 9, 2011. Vienna University of Technology, https://repositum.tuwien.at/bitstream/20.500.12708/9299/2/Lehotsky%20Andrej%20-%202011%20-%20Structuring%20and%20enhancing%20IT%20security%20in%20core%20mobile...pdf, 115 pages.

Mell et al., "The NIST Definition of Cloud Computing", National Institute of Standards and Technology, Special Publication 800-145, Sep. 2011, 7 pages.

Moon et al. "MalAware Defensive: A Game to Train Users to Combat Malware." Journal of Cybersecurity Education, Research and Practice, vol. 2020, No. 1, Article 2, Jun. 2020, 19 pages.

Tan et al. "Adaptive Security Awareness Training Using Linked Open Data Datasets." Education and Information Technologies, Accepted Mar. 12, 2020, https://doi.org/10.1007/s10639-020-10155-x, 28 pages.

* cited by examiner

COGNITIVE MALWARE AWARENESS IMPROVEMENT WITH CYCLAMATES

BACKGROUND

The present invention relates, generally, to the field of computing, and more particularly to cybersecurity.

Cybersecurity is the protection of computer systems and networks from information disclosure, theft of or damage to hardware, software, or electronic data, as well as from the disruption or misdirection of the services the computer systems provide. Cybersecurity is one of the significant challenges in the computerized environment, due to its complexity. The primary goal of cybersecurity is to ensure dependability, integrity, and data privacy of the computer system.

SUMMARY

According to one embodiment, a method, computer system, and computer program product for cyber awareness improvement is provided. The present invention may include an embodiment that determines an access level within an organization. The embodiment may generate a simulated scenario based on the access level. The embodiment may identify responses of the user to the generated simulated scenario. The embodiment may capture one or more input frames. The embodiment may analyze the responses and the one or more input frames and generate education for the user based on the responses and the one or more input frames.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
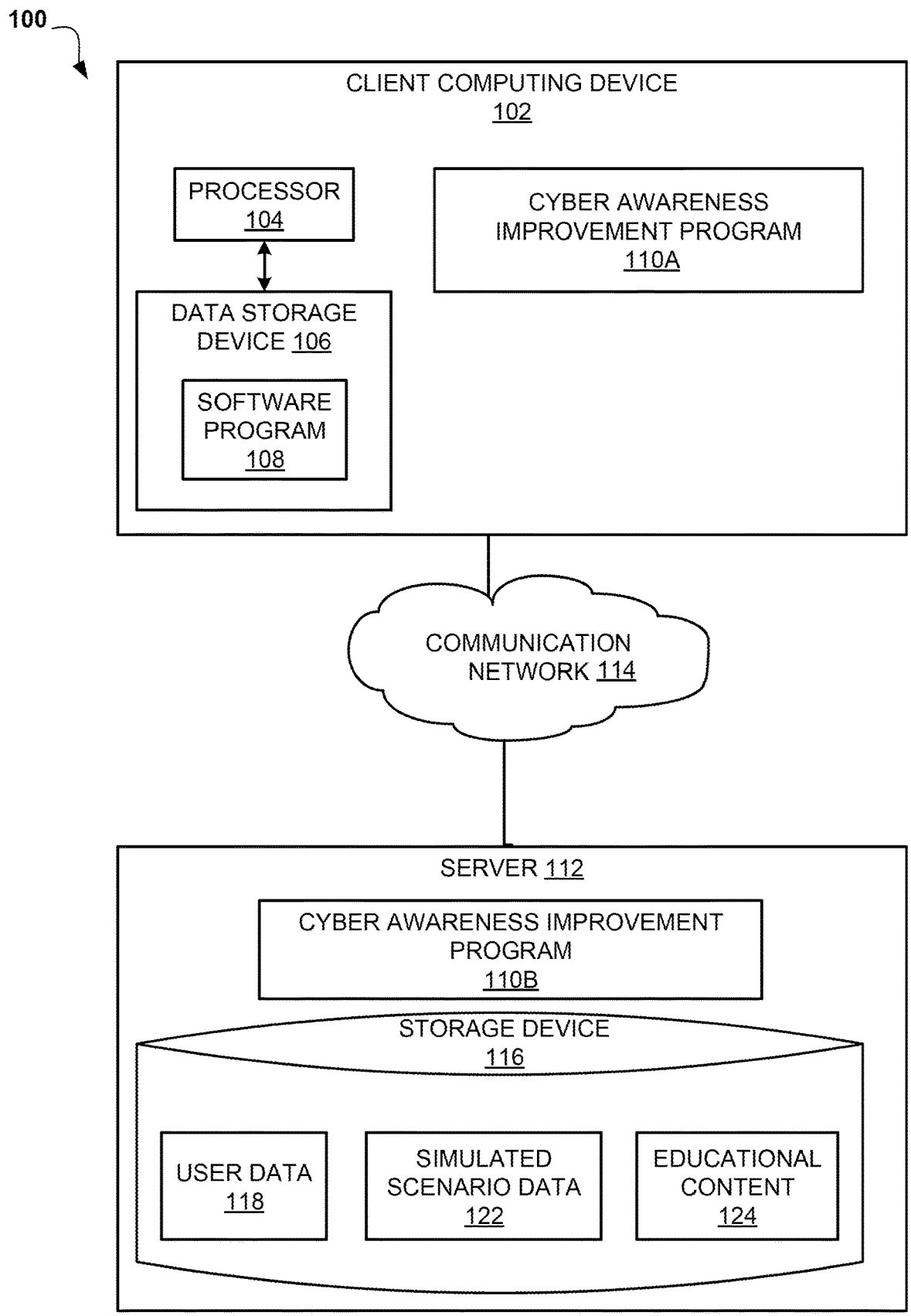
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to cybersecurity. The following described exemplary embodiments provide a system, method, and program product to, among other things, mitigate cybersecurity risks by creating of synthetic situations that train the behavior and responses of a user under a simulated scenario. Therefore, the present embodiment has the capacity to improve the technical field of cybersecurity by identifying user cybersecurity risks and exercising a synthetic simulated scenario based on the identified cybersecurity risks using a cybersecurity trap model. The cybersecurity trap approach is a computer security mechanism that is set to detect, deflect, or, in some manner, counteract attempts of an unauthorized use of information systems. Typically, the cybersecurity trap model consists of data (for example, in a network site) that appears to be a legitimate part of the site and contain information or resources of value to attackers. It is actually isolated, monitored, and capable of blocking or analyzing the attackers.

The cybersecurity trap model is a process of generating a simulated scenario where the cyclamate (an artificial sweetener) is an implementation of using the educational content and real data extracted from the user display inputs in order to generate a simulated scenario with real data from the user. According to cyclamate implementation, a system may assign and evaluate a type of a simulated scenario based on the coursework content similar to an attack where the artificial sweetener magnitude is correlated to intermediate quiz results, content dwell time and content interaction rate. The interaction of the user with the simulated scenario reinforces the artificial sweetener magnitude value while the system may alter the rate of a simulated scenario and complexity of interaction with the user based on the artificial sweetener magnitude interpretability by utilizing a bin packing approach. Each dwell on content may be used to prioritize the corpora of knowledge for brain plasticity to select both the next attack and the content for further user education. The educational module may then be reevaluated using the reinforcement value that correlates with an optimal brain plasticity.

From a mathematical standpoint, if $w_j$ is a quality volume of sentence j and c is a quality volume of a bin, then each sentence may be assigned to one bin so that the total quality volume of all sentences in each bin does not exceed a value of c. As a result, the objective of the optimization problem is to minimize the total number of bins used to hold all sentences z. Thus, Minimize $z=\Sigma_{i=1}^{n} y_i$, where the following constraints are bound to the allocations of the sentences to the bins. In order to qualify volume w for each item assigned to a bin, x has to be less than or equal to the total quality volume of a bin $\Sigma_{j=1}^{n} w_j x_j \leq c y_i$, where $i \in N\{1, \ldots, n\}$. Each sentence may only be assigned to one bin thus, $\Sigma_{i=1}^{n} x_{ij}=1$, where $j \in N$. The scaler $y_i$ determines when a bin is used thus, $y_i=0$ or 1 where $i \in N$. The scaler $x_{ij}$ determines when an item j is assigned to bin i thus, $x_{ij}=0$ or 1 where $i \in N$ and $j \in N$ while the definitions of x and y are as follows:

$$y_i = \begin{cases} 1 & \text{if bin } i \text{ is used} \\ 0 & \text{otherwise} \end{cases} \text{ and } x_{ij} = \begin{cases} 1 & \text{if item } j \text{ is assigned to bin } i \\ 0 & \text{otherwise} \end{cases}.$$

As previously described, cybersecurity is the protection of computer systems and networks from information disclosure, theft of or damage to hardware, software, or electronic data, as well as from the disruption or misdirection of the services the computer systems provide. Cybersecurity is one of the significant challenges in the computerized environment, due to its complexity. The primary goal of cybersecurity is to ensure dependability, integrity, and data privacy of the computer system.

Typically, a company provides employee education on spam and cybersecurity threats and mitigation. However, this education is frequently ineffective because the education is done in a generalized fashion and not customized to the particular levels of knowledge and experience of the user. Furthermore, there is no consideration and focus on likely avenues of vulnerabilities that may vary with the role of a particular user within an organization. For example, a receptionist that receives a lot of phone calls may be more vulnerable to social engineering while a software developer may be more vulnerable to installing a keylogger as a result of clicking on an e-mail link received from another user that appears to be associated with the same organization. As such, it may be advantageous to, among other things, implement a system that generates customized vulnerability assessments and custom education for a user based on multiple factors in order to interactively train the user to reduce cybersecurity risks associated with a current user role.

According to an embodiment, after opting in, synthetic situations may be created that exercise the simulated scenario behavior and evaluate responses of the user under attack for user tailored education. The magnitude of a cybersecurity trap model may be dependent on the complexity of the coursework and a role the user should be trained for. The imposition of an artificial simulated scenario on the user system enables optimal plasticity of the brain training for learning and retaining of the information. Thus, the generated simulated scenario of the system of the user may increase brain plasticity through curiosity and test the cybersecurity user content retainment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a simulated scenario utilizing cyclamates (an artificial sweetener) as an implementation of using the educational content and real data extracted from the user display in order to personalize the generated simulated scenario with real user data.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cyber awareness improvement program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a cyber awareness improvement system program 110B and a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The storage device 116 may store a user data 118, simulated scenario data 122 and educational content 124 databases. The user data 118 may include personal data of each user that opted in the services of the cyber awareness improvement program such as an organization name, and a role of the user, and a level of cybersecurity education received by the user. The simulated scenario data 122 may be a database that records various cyberattacks that were recorded against various organizations and roles of the users within an organization. The educational content 124 may be an indexed database that stores educational content to prevent cybersecurity attacks.

According to the present embodiment, the cyber awareness improvement program 110A, 110B may be a program capable of generating a synthetic cyberattack against a user system using data familiar to the user, and, after identifying user responses, generating a tailored educational content to improve user knowledge in prevention of a cyberattack. The cyber awareness improvement method is explained in further detail below with respect to FIG. 2.

Figure 2:
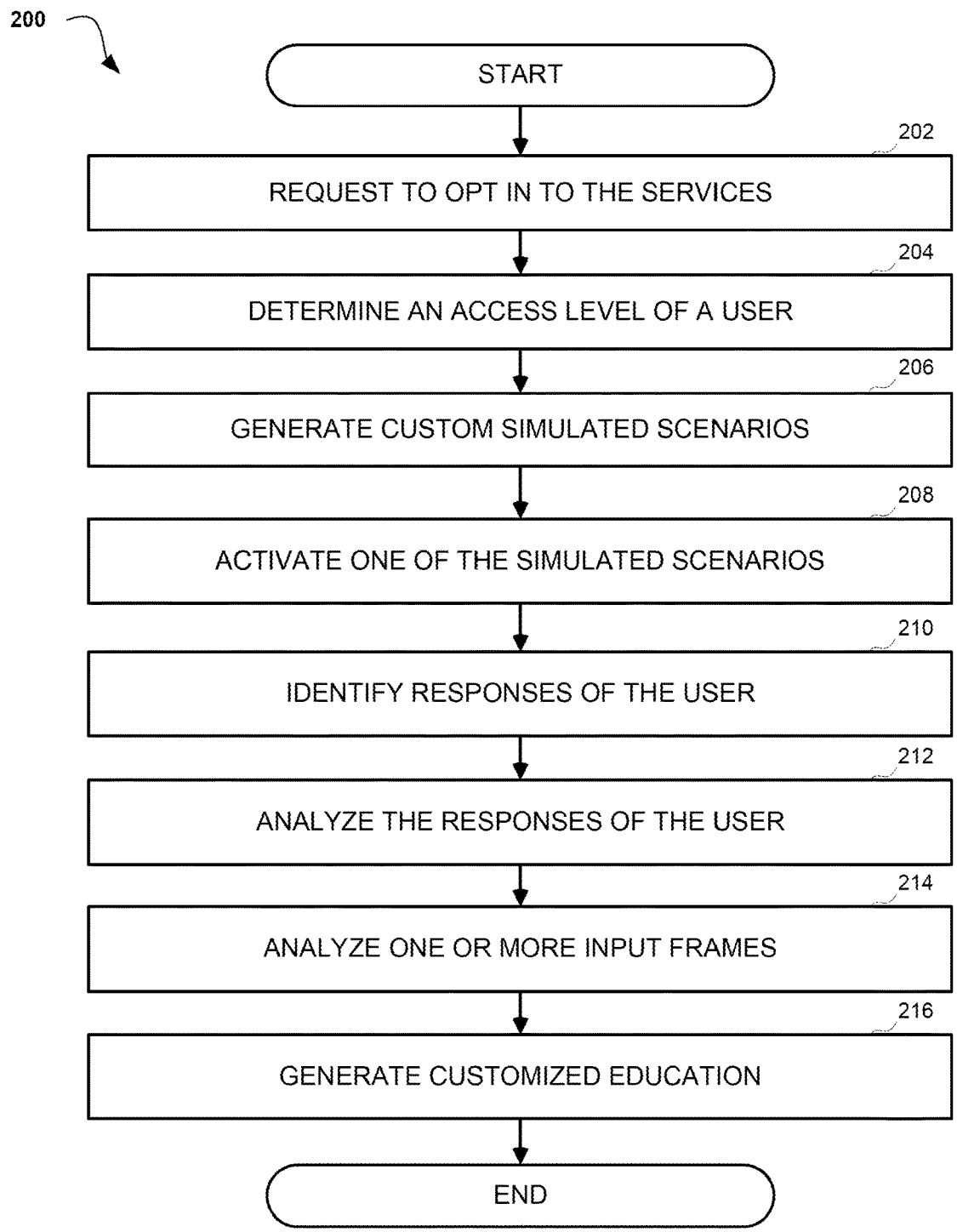
FIG. 2 is an operational flowchart illustrating a cyber awareness improvement process according to at least one embodiment.

Referring now to FIG. 2, an operational flowchart illustrating a cyber awareness improvement process 200 is depicted according to at least one embodiment. At 202, the cyber awareness improvement program 110A, 110B requests a user to opt-in to the cyber awareness services. According to an example embodiment, the cyber awareness improvement program 110A, 110B may request an individual that wants to identify and prevent cyberattacks to opt-in for the services using a Graphical User Interface (GUI) of the client computing device 102. In another embodiment, the cyber awareness improvement program 110A, 110B may display a summary of the services and request an individual to acknowledge consent for the services. In further embodiments, while the user opts-in for the services, cyber awareness improvement program 110A, 110B may request an authorization and capture one or more frames of the display for the generated simulated scenario. Furthermore, the cyber awareness improvement program 110A, 110B may inform a user what data would be collected and may encrypt all of the collected data and enable the user to opt-out at any time, using a GUI, while opt-out from the services automatically deletes all of the personal data of the user.

Next, at 204, the cyber awareness improvement program 110A, 110B determines a user access level. According to an example embodiment, cyber awareness improvement program 110A, 110B may determine the access level of the user based on the role and interactions with peers extracted from user data 118 of the organization with which the user is associated. In another embodiment, the cyber awareness improvement program 110A, 110B may monitor each opted-in user and update the access level of the user based on determining a change in the role or change in the organization. In further embodiments, the cyber awareness improvement program 110A, 110B may utilize data mined from the Internet that is related to recent cyberattacks in order to identify potential threats to users that need to be trained. For example, if a recent cyberattack was utilizing human engineering by pretending to be an employee of the organization, the cyber awareness improvement program 110A, 110B may identify all of the users that may be targeted using this approach such as administrative workers of the organization.

Then, at 206, the cyber awareness improvement program 110A, 110B generates custom simulated scenarios. According to an example embodiment, cyber awareness improvement program 110A, 110B may use the determined access level of the user to generate a custom simulated scenario of a cyberattack using the cybersecurity trap model. For example, for a user who is an administrative assistant of an organization, the cyber awareness improvement program 110A, 110B may generated an artificial intelligence (AI) simulated call that may ask for some confidential information that should not be given out to the public. In another example, when a user is a software developer, the cyber awareness improvement program 110A, 110B may generate a simulated email requesting an urgent "update" to one of the programs and suggesting clicking on a link to get the update. The cyber awareness improvement program 110A, 110B may use a previously assigned valuation to a type of a simulated scenario based on the similarity of the simulated scenario to the educational content 124, where the similarity may be determined by utilizing Cosine similarity techniques. The cyber awareness improvement program 110A, 110B may utilize a cybersecurity trap method that is correlated using intermediate quiz results of the educational content 124 of users with a similar role. In further embodiments, the cyber awareness improvement program 110A, 110B may alter the rate of simulated scenarios and complexity of interactions with the user based on the artificial sweetener magnitude value interpretability and bin packing approaches. As explained above, the bin packing approach is an optimization problem, where items of different sizes are packed into a finite number of bins or containers, each of a fixed given capacity, in a way that minimizes the number of "bins" used.

Next, at 208, the cyber awareness improvement program 110A, 110B activates one of the simulated scenarios. According to an example embodiment, cyber awareness improvement program 110A, 110B may activate one of the simulated scenarios randomly. In another embodiment, the cyber awareness improvement program 110A, 110B may rank the scenarios based on recently known simulated scenarios such as by identifying the closest scenario to a recent simulated scenario by clustering the simulated scenarios to the data in the simulated scenario data 122 and activating a scenario that is in the cluster related to the recent simulated scenario.

Then, at 210, the cyber awareness improvement program 110A, 110B identifies responses of the user. According to an example embodiment, cyber awareness improvement program 110A, 110B may identify responses of the user to the simulated scenario using plugins that may request, via GUI, and after user authorization, capture one or more screen frames for further analysis. In another embodiment, the cyber awareness improvement program 110A, 110B may request a user to authorize a limited use of a keylogger to capture the mouse and keyboard inputs to evaluate user responses to the simulated attack. In further embodiments, the cyber awareness improvement program 110A, 110B may utilize other input devices after prior authorization by the user for the purpose of identifying user responses to the simulated scenario. For example, if the simulated attack was a simulated caller that attempted to receive classified information from the user using social engineering, the cyber awareness improvement program 110A, 110B may identify user responses such as whether the user tried to access the requested classified information from the server of the organization for future educational purposes of the user. Furthermore, the interaction of the user with the simulated scenario reinforces the artificial sweetener magnitude that may be used by the cyber awareness improvement program 110A, 110B for generating a more specific educational content.

Next, at 212, the cyber awareness improvement program 110A, 110B analyzes the responses of the user. According to an example embodiment, cyber awareness improvement program 110A, 110B may analyze responses of the user to identify possible ramifications of the actions taken by the user. The responses of the user may be converted to text, such as by usage of speech-to-text technique. For example, the cyber awareness improvement program 110A, 110B may analyze whether the user opened the simulated link and forwarded the simulated link to other users, and identify other services the user was using during the simulated attack in order to determine possible vulnerabilities of the services.

Then, at 214, the cyber awareness improvement program 110A, 110B analyzes one or more input frames. According to an example embodiment, cyber awareness improvement program 110A, 110B may take one or more snapshots of a user display screen in the form of input frames, when the user is engaging with the client computing device 102. The input frames may then be analyzed using a YOLOv4 network for a raster scan and identification of tables, hyperlinks, textual data, etc. The YOLOv4 is a machine learning model for fast object detection in a single image. Then, the cyber awareness improvement program 110A, 110B may scrape the information from the detected objects, in a similar way as web pages are scraped using a Python Beautiful Soup or Scrapy library methods. When the scraped information is a hyperlink, the cyber awareness improvement program 110A, 110B may utilize a decision tree with Beautiful Soup to extract a risk stratified topic classified as: malware, trojan horse, virus, worm, general security, biometric authentication, phishing, cyber trap, keylogger, DDos attack, etc. The scraped information may be further fed into a type of statistical modeling for discovering the abstract topics, such as by utilizing Latent Dircihlet Allocation (LDA) topic modelling and organized in a database and compared to educational content 124 using a cosine similarity model. In further embodiments, the cyber awareness improvement program 110A, 110B may use the objects and the abstract topics for future simulations for the user.

Next, at 216, the cyber awareness improvement program 110A, 110B generates customized education. According to an example embodiment, cyber awareness improvement program 110A, 110B may flag all of the similarities identified by the cosine similarity analysis in the educational content 124 and generate a customized education that explains the risks and outlines the best practice responses to the simulated scenario using data from the input frames. In another embodiment, the cyber awareness improvement program 110A, 110B may determine an interval for a follow up simulated scenario based on the user inputs or based on a timeframe set by a user. In further embodiments, the cyber awareness improvement program 110A, 110B may generate a unique profile of each user that is tied to a role based on activities that may aid the cyber awareness improvement program 110A, 110B in the future prediction of simulated scenarios for training amelioration for various role types. This profile of the user may be role specific within the organization that may enable users to have predicted unique educational programs based on their role paths. Furthermore, cyber awareness improvement program 110A, 110B may measure dwell time on content to prioritize the customized education topics for improvement of brain plasticity and for a next simulated scenario.

It may be appreciated that FIG. 2 provides only an illustration of one implementation and does not imply any limitations with regard to how different embodiments may be implemented. Many modifications to the depicted environments may be made based on design and implementation requirements. For example, the method may be used for crowdsourced role infusion for baseline training management. The crowdsourcing of the type of tasks may be warranted by a position and spot the delta task identifiers beyond a typical role of a user in the organization that is considered for said training. This would allow situations where a normal set of activities and training are warranted for someone that is working as an administrative assistant and that aids in the identification of a baseline for said role. Spotting the specific tasks that are more common to a particular role would enable training to be tailored to said role as a starting point for any new user or an existing user switching to a new role. In another embodiment, the role based task prediction for training amelioration may be utilized. For example, based on the tasks carried out by a user, the aforementioned process may assess the evolution of various tasking and training programs and predict the training amelioration for an upcoming shift of a user into new areas. The shift into a new area may be treated as a logical progression for areas known within continuing education, job development, career enhancement, or any unique malware or spam focused tasking target that may be predicted for any specific task evolution.

Figure 3:
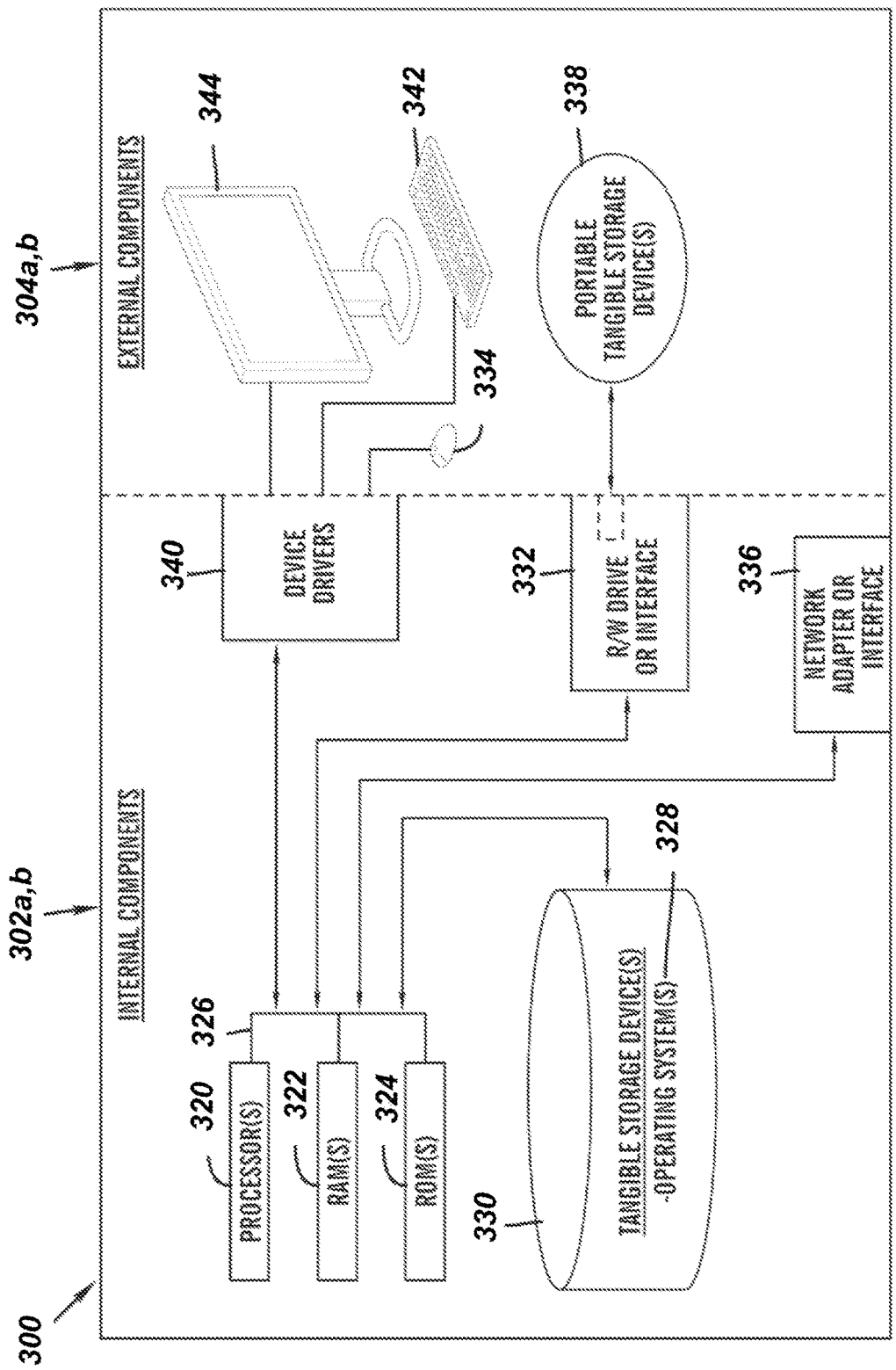
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the cyber awareness improvement program 110A in the client computing device 102, and the cyber awareness improvement program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the cyber awareness improvement program 110A, 110B, can be stored on one or more of the respective portable computer-readable tangible storage devices 338, read via the respective RAY drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the cyber awareness improvement program 110A in the client computing device 102 and the cyber awareness improvement program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the cyber awareness improvement program 110A in the client computing device 102 and the cyber awareness improvement program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
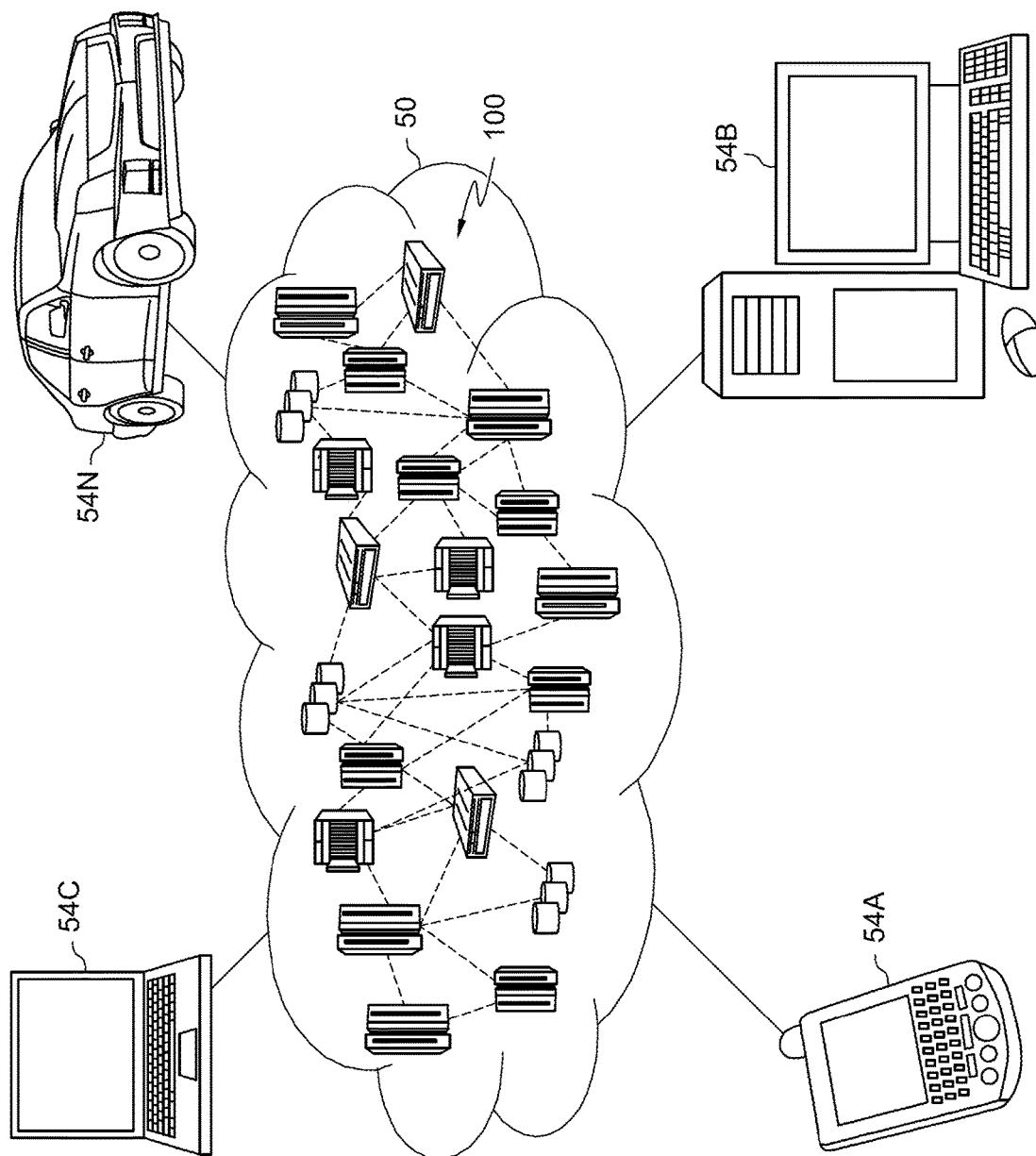
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
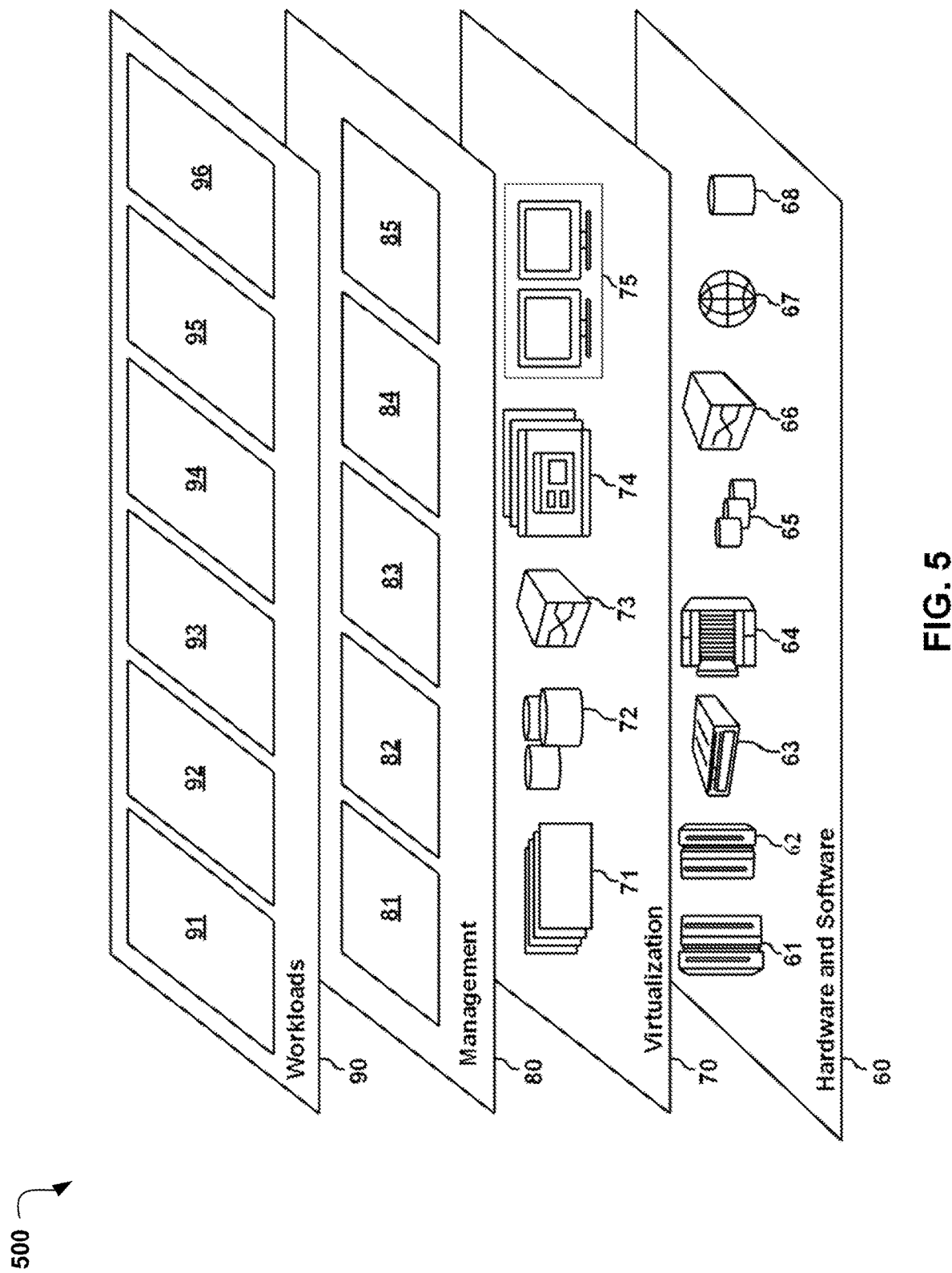
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cyber awareness training 96. Cyber awareness training 96 may relate to determining an access level of a user and generate a simulated scenario based on the access level while analyzing the user responses in order to generate an educational material tailored to the user based on user responses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for cyber awareness improvement, the method comprising:
    determining an access level of a user within an organization;
    generating a simulated scenario based on the access level, wherein the simulated scenario is generated utilizing a cybersecurity trap model, wherein utilizing the cybersecurity trap model comprises:
    assigning a magnitude valuation to the simulated scenario based on a similarity of the simulated scenario with previous educational content taken by multiple users having a same access level as the user, wherein the magnitude valuation is correlated with intermediate quiz results of the educational content of the multiple users;
    identifying responses of the user to the generated simulated scenario, wherein the responses of the user to the simulated scenario reinforce the magnitude valuation;
    capturing one or more input frames;
    analyzing the responses and the one or more input frames; and
    generating customized cybersecurity education for the user based on the responses and the one or more input frames.

2. The method of claim 1, further comprising:
    generating a new simulated scenario based on the analyzed responses and the one or more input frames.

3. The method of claim 1, wherein the one or more input frames are analyzed using a machine learning model for fast object detection in a single image.

4. The method of claim 3, wherein the one or more input frames are further analyzed using Latent Dircihlet Allocation (LDA) topic modelling.

5. The method of claim 1, wherein generating education for the user further comprises utilizing a cosine similarity between an educational content and the one or more analyzed frames.

6. The method of claim 1, wherein the responses are analyzed using a keylogger.

7. A computer system for cyber awareness improvement, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    determining an access level of a user within an organization;
    generating a simulated scenario based on the access level, wherein the simulated scenario is generated utilizing a cybersecurity trap model, wherein utilizing the cybersecurity trap model comprises:
    assigning a magnitude valuation to the simulated scenario based on a similarity of the simulated scenario with previous educational content taken by multiple users having a same access level as the user, wherein the magnitude valuation is correlated with intermediate quiz results of the educational content of the multiple users;
    identifying responses of the user to the generated simulated scenario, wherein the responses of the user to the simulated scenario reinforce the magnitude valuation;
    capturing one or more input frames;
    analyzing the responses and the one or more input frames; and
    generating customized cybersecurity education for the user based on the responses and the one or more input frames.

8. The computer system of claim 7, further comprising:
    generating a new simulated scenario based on the analyzed responses and the one or more input frames.

9. The computer system of claim 7, wherein the one or more input frames are analyzed using a machine learning model for fast object detection in a single image.

10. The computer system of claim 9, wherein the one or more input frames are further analyzed using Latent Dircihlet Allocation (LDA) topic modelling.

11. The computer system of claim 7, wherein generating education for the user further comprises utilizing a cosine similarity between an educational content and the one or more analyzed frames.

12. The computer system of claim 7, wherein the responses are analyzed using a keylogger.

13. A computer program product for cyber awareness improvement, the computer program product comprising:
one or more computer-readable tangible storage medium and program instructions stored on at least one of the one or more tangible storage medium, the program instructions executable by a processor, the program instructions comprising: program instructions to determine an access level of a user within an organization;
program instructions to generate a simulated scenario based on the access level, wherein the simulated scenario is generated utilizing a cybersecurity trap model, wherein utilizing the cybersecurity trap model comprises:
assigning a magnitude valuation to the simulated scenario based on a similarity of the simulated scenario with previous educational content taken by multiple users having a same access level as the user, wherein the magnitude valuation is correlated with intermediate quiz results of the educational content of the multiple users;
program instructions to identify responses of the user to the generated simulated scenario, wherein the responses of the user to the simulated scenario reinforce the magnitude valuation;
program instructions to capture one or more input frames;
program instructions to analyze the responses and the one or more input frames;
and program instructions to generate customized cybersecurity education for the user based on the responses and the one or more input frames.

14. The computer program product of claim 13, further comprising:
program instructions to generate a new simulated scenario based on the analyzed responses and the one or more input frames.

15. The computer program product of claim 13, wherein the one or more input frames are analyzed using a machine learning model for fast object detection in a single image.

16. The computer program product of claim 15, wherein the one or more input frames are further analyzed using Latent Dircihlet Allocation (LDA) topic modelling.

17. The computer program product of claim 13, wherein program instructions to generate education for the user further comprises utilizing a cosine similarity between an educational content and the one or more analyzed frames.

* * * * *